United States Patent [19]
Askeland et al.

[11] Patent Number: 5,976,230
[45] Date of Patent: Nov. 2, 1999

[54] REACTIVE INK SET FOR INK-JET PRINTING

[75] Inventors: Ronald A. Askeland, San Diego, Calif.; Mark S. Hickman, Vancouver, Wash.

[73] Assignee: Hewlett-Packard Company, Palo Alto, Calif.

[21] Appl. No.: 09/069,717

[22] Filed: Apr. 29, 1998

[51] Int. Cl.$^6$ ................................................ C09D 11/02
[52] U.S. Cl. ...................................... 106/31.27; 106/31.6
[58] Field of Search ................................ 106/31.27, 31.6

[56] References Cited

U.S. PATENT DOCUMENTS

| | | | |
|---|---|---|---|
| 4,438,191 | 3/1984 | Cloutier et al. | 430/324 |
| 4,922,265 | 5/1990 | Pan | 346/1.1 |
| 4,963,189 | 10/1990 | Hindagolla | 106/22 |
| 5,057,852 | 10/1991 | Formica et al. | 346/1.1 |
| 5,085,698 | 2/1992 | Ma et al. | 106/20 |
| 5,181,045 | 1/1993 | Shields et al. | 346/1.1 |
| 5,198,023 | 3/1993 | Stoffel | 106/22 R |
| 5,371,531 | 12/1994 | Rezanka et al. | 347/43 |
| 5,428,377 | 6/1995 | Stoffel et al. | 347/15 |
| 5,428,383 | 6/1995 | Shields et al. | 347/96 |
| 5,455,610 | 10/1995 | Harrington | 347/43 |
| 5,488,402 | 1/1996 | Shields et al. | 347/96 |
| 5,518,534 | 5/1996 | Pearlstine et al. | 106/31.6 |
| 5,536,306 | 7/1996 | Johnson et al. | 106/31.58 |
| 5,555,008 | 9/1996 | Stoffel et al. | 347/100 |
| 5,679,143 | 10/1997 | Looman | 106/20 R |
| 5,713,993 | 2/1998 | Page et al. | 106/31.85 |
| 5,735,941 | 4/1998 | Feeman et al. | 106/31.6 |
| 5,750,594 | 5/1998 | Page et al. | 106/31.86 |
| 5,785,743 | 7/1998 | Adamic et al. | 106/21.27 |
| 5,853,465 | 12/1998 | Tsang et al. | 106/31.27 |

*Primary Examiner*—Helene Klemanski

[57] ABSTRACT

An ink set and method for ink-jet printing using the same are disclosed, the ink set comprising inks comprising an aqueous vehicle and a colorant, the ink set comprising at least two mutually reactive inks, the at least two mutually reactive inks comprising a first and a second ink; and an ink non-reactive with the at least two mutually reactive inks. The present ink set utilizes the advantages of reactive inks while allowing flexibility in the design of the inks and the architecture of the ink-jet printing systems in which they are used.

27 Claims, 1 Drawing Sheet

REACTIVE INK SET FOR INK-JET PRINTING

CROSS REFERENCE TO RELATED APPLICATIONS

The present application is related to U.S. application Ser. No. 09/069,616, Attorney Docket Number 10980131, entitled "Multi-Chamber Ink Supply," by Askeland, assigned to same assignee as the present invention, and filed herewith.

FIELD OF INVENTION

The present invention relates to reactive inks employed in ink-jet printing and, more particularly, to reactive ink sets having a non-reactive subset.

BACKGROUND OF INVENTION

Ink-jet printing is a non-impact printing process in which droplets of ink are deposited on a print medium in a particular order to form alphanumeric characters, area-fills, and other patterns thereon. Low cost and high quality of the hardcopy output, combined with relatively noise-free operation, have made ink-jet printers a popular alternative to other types of printers used with computers.

The non-impact printing process of ink-jet printing involves the ejection of fine droplets of ink onto a print medium such as paper, transparency film, or textiles in response to electrical signals generated by a microprocessor. There are two basic means currently available for achieving ink droplet ejection in ink-jet printing: thermally and piezo-electrically. In thermal ink-jet printing, the energy for drop ejection is generated by electrically heated resistor elements, which heat up rapidly in response to electrical signals from a microprocessor to create a vapor bubble, resulting in the expulsion of ink through nozzles associated with the resistor elements. In piezoelectric ink-jet printing, the ink droplets are ejected due to the vibrations of piezoelectric crystals, again, in response to electrical signals generated by the microprocessor.

In thermal ink-jet printing, an ink-jet image is formed when a precise pattern of dots is ejected from a drop generating device known as a "printhead" onto a printing medium. The typical ink-jet printhead has an array of precisely formed nozzles (or ejector portions) attached to a thermal ink-jet printhead substrate, such as silicon, nickel, or polyimide, or a combination thereof. The substrate incorporates an array of firing chambers or drop ejector portions that receive liquid ink (colorants dissolved or dispersed in a solvent) through fluid communication with one or more ink reservoir. Each firing chamber has a thin-film resistor, known as a "firing resistor," located opposite the nozzle so ink can collect between the firing resistor and the nozzle. The printhead is mounted on a carriage that travels along the width of the printer (otherwise the "scan axis").

Commercially-available thermal ink-jet printers, such as DeskJet® printers available from Hewlett-Packard Company, use inks of differing hues, namely, magenta, yellow, and cyan, and optionally black. The particular set of colorants, e.g., dyes, used to make the inks is called a "primary dye set." A spectrum of colors, e.g., secondary colors, can be generated using different combinations of the primary dye set.

One category of ink-jet printers utilizes disposable printheads in which the ink reservoirs are on-board the carriage, thus the term on-board or on-axis. The reservoirs can be formed integrally with the printhead portions or they can be detachably connected thereto.

Another category of ink-jet printers employs ink reservoirs that are not located on the carriage, thus the term off-board or off-axis. In one case, the reservoir intermittently replenishes the printhead with ink when the printhead travels to a stationary reservoir periodically for replenishment. Another type makes use of a replaceable ink reservoir connected to the printhead by a fluid conduit. The printhead is replenished with ink through this fluid conduit.

The reservoirs may be individually (separate from other reservoirs) replaceable or the reservoirs can be formed as one integral reservoir portion, to be replaced as a unit.

Different printhead/ink reservoir configurations address different customer needs. For example, on-board designs provide for ease of use. Printers using the off-board designs provide for less interruptions during printing jobs which require larger ink volumes, such as large format printing.

In general, a successful ink set for color ink-jet printing should have the following properties: good crusting resistance, good stability, the proper viscosity, the proper surface tension, good color-to-color bleed alleviation, rapid dry time, no negative reaction with the vehicle, consumer-safety, and low strike-through. When placed into a thermal ink-jet system, the ink set should also be kogation-resistant. Furthermore, the successful ink set should be robust enough to provide flexibility in the design and configuration of the ink-jet print cartridge.

Regardless of whether an ink is dye-based or pigment-based, ink-jet inks commonly face the challenge of color-to-color or black-to-color bleed control. The term "bleed", as used herein, is defined to be the invasion of one color into another, once the ink is deposited on the print medium, as evidenced by a ragged border therebetween. Bleed occurs as colors mix both on the surface of the paper substrate as well as within the substrate itself. The occurrence of bleed is especially problematic between a black ink and an adjacently-printed color ink because it is all the more visible. Hence, to achieve good print quality, bleed should be substantially reduced or eliminated such that borders between colors are clean and free from the invasion of one color into the other.

One approach used for controlling bleed between the printed images, as disclosed in U.S. Pat. No. 5,428,383, entitled "Method and Apparatus for Preventing Color Bleed in a Multi-Ink Printing System," filed by Shields et al., and assigned to the same assignee as the present invention, and incorporated herein by reference, is to employ a precipitating agent (e.g., a multi-valent metal salt) in one ink, and a colorant, preferably in the form of an organic dye having at least one and preferably two or more carboxyl and/or carboxylate groups, in another ink, preferably the black ink. When the inks are printed on the printing medium adjacent one another, the ink containing the precipitating agent brings about the precipitation of the colorant with the carboxyl/carboxylate group, thereby preventing the migration of the colorant in the other ink, thereby reducing bleed between the two adjacently printed areas.

Another method of reducing bleed between ink-jet inks involves the use of pH-sensitive dyes as disclosed in U.S. Pat. No. 5,181,045 entitled "Bleed Alleviation Using pH-sensitive Dyes/Inks," filed by Shields et al, and assigned to the same assignee as the present invention, and incorporated herein by reference. It disclosed therein that an ink having a pH-sensitive dye, the "pH-sensitive ink," would be prevented from bleeding into an adjacent ink having an appropriate pH, the "target ink". More particularly, migration of the ink having the pH-sensitive dye is prevented by rendering the dye insoluble on the page by contact with the adjacent ink having the appropriate pH. Thus, bleed is reduced or eliminated by using both the "pH-sensitive" ink as well as the "target" ink. Typically, since the invasion of a black dye into a color ink is more problematic than vice versa because of its greater visibility, the black ink would employ the pH-sensitive dye and the pH of the color ink would be controlled in the practice of the invention, such that the black ink would be prevented from bleeding into the color ink. The method of U.S. Pat. No. 5,181,045 requires a pH differential of about 4 (or even 5) units to completely control bleed.

U.S. application Ser. No. 08/567974, entitled "Bleed Alleviation in Ink-Jet Inks using Organic Acids," filed by Adamic et al. on Dec. 6, 1995, and assigned to the same assignee as the present invention) and U.S. Pat. No. 5,679,143 (entitled "Bleed Alleviation in Ink-jet Inks Using Acids Containing a Basic Functional Group," filed by Looman and assigned to the same assignee as the present invention), both incorporated herein by reference, further disclose methods for controlling bleed by forcing the precipitation of a pH-sensitive dye in one ink (the pH-sensitive ink) on the print medium by contacting the pH-sensitive dye with a second ink (the target ink) having an appropriate pH (either higher or lower than the first ink). Upon contact on the print medium, the pH-sensitive dye of the first ink becomes insoluble, thus bleeding less. U.S. application Ser. No. 08/567974 discloses the use of organic acids to reduce the pH differential required to effect precipitation of a pH-sensitive dye colorant as compared to that disclosed in U.S. Pat. No. 5,181,045, described above. U.S. Pat. No. 5,679,143 employs the use of an organic acid having no basic functional groups and a pH adjusting organic compound containing both acidic and basic functional groups, specifically, at least one acidic functional group and at least one basic functional group, where the number of basic functional groups is the same as or greater than the number of acidic functional groups. The presence of the organic acid in the ink-jet ink composition reduces the pH differential required to render insoluble the pH-sensitive colorant of a second encroaching ink-jet ink composition, as described in U.S. application Ser. No. 08/567974 above. The presence of the dual-function pH adjusting compound further increases the concentration of an acid functional group in the ink-jet ink composition while also increasing the pH of the ink-jet ink composition to acceptable levels. Therefore, the dual-function pH adjusting compound augments the bleed alleviation achieved by an organic acid alone according to the mechanism disclosed in Ser. No. 08/567974.

In order to prevent the occurrence of bleed between the primary (e.g., cyan, magenta, and yellow) and secondary colors (e.g., red, blue, and green) with black, all the three primary colors are designed to be reactive with the black ink according to reaction mechanisms such as those described above (multi-valent metal salt, pH-sensitive dye.

The above solutions, although of merit, do not maximize flexibility in the design of the inks and printing systems in which they are used. For example, using reactive ink systems may lead to unwanted mixing of the reactive inks, hence contributing to reliability problems in the printing system, particularly in compact printhead arrangements or compact ink delivery arrangements.

Therefore, a need exists for a reactive ink set that can utilize the advantages of reactive inks while allowing flexibility in the design of the inks and the architecture of the ink-jet printing systems in which they are used.

DISCLOSURE OF INVENTION

In accordance with the invention, an ink set and method for printing using the same are disclosed, the ink set comprising inks comprising an aqueous vehicle and a colorant, the ink set comprising at least two mutually reactive inks; and an ink non-reactive with the at least two mutually reactive inks. The present ink set utilizes the advantages of reactive inks while allowing flexibility in the design of the inks and the architecture of the ink-jet printing systems in which they are used.

DETAILED DESCRIPTION OF THE INVENTION

Definitions

Figure 1A:
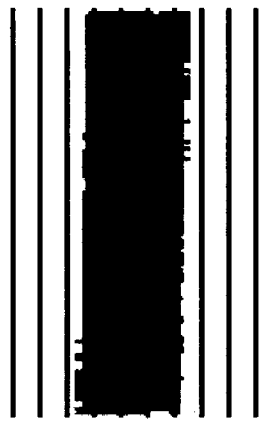
FIG. 1(a) is a line drawing illustrating the bleed occurring between black and cyan (represented by thin vertical lines) inks wherein the black and cyan inks are reactive with one another.

Reactive ink—An ink that has an ingredient reactive with an ingredient in another ink thus providing for enhanced properties, such as, reducing bleed between the reactive ink and the other ink in the event that the reactive ink and the other ink are adjacently printed on a print medium.

Mutually reactive inks—Inks that are reactive with one another.

Non-reactive ink—An ink that is non-reactive with a mutually reactive ink.

Integral Printhead—A printhead having an array of drop ejector portions that are permanently attached to a rigid structure. Ejector portions are fabricated from materials including silicon, nickel, polyimide, or a combination thereof. Such techniques of forming a monolithic printhead are known in the art and are discussed in publication such as U.S. Pat. Nos. 4,438,191 and 4,922,265, both assigned to the assignee of the present invention.

Integral Print Cartridge—An ink jet printhead portion, and; at least one reservoir chamber, or an integral reservoir portion; forming an integral print cartridge.

On-board (on-axis)—A category of ink-jet printers utilizing disposable printheads in which the ink reservoirs are on-board the carriage. The reservoirs can be formed integrally with the printhead portion or detachably connected thereto.

Off-board (off-axis)—A category of ink-jet printers employing ink reservoirs that are not located on the carriage.

In one case, the reservoir intermittently replenishes the printhead with ink when the printhead travels to a stationary reservoir periodically for replenishment. Another type makes use of a replaceable ink reservoir connected to the printhead by a fluid conduit. The printhead is replenished with ink through this fluid conduit.

Description

The present ink set comprises at least two mutually reactive inks and an ink non-reactive with the at least two mutually reactive inks. In the preferred embodiment, the ink set comprises at least four inks, each of the inks comprising an aqueous vehicle, and a colorant. In accordance with the invention, a first ink is reactive with a second ink, and is non-reactive with a third ink. Preferably, the first ink is reactive with also a fourth ink. More preferably, the first and third inks are black and cyan, respectively, and the second ink is selected from the group consisting of magenta and yellow. Most preferably the second ink is magenta and the fourth ink is yellow. It should be appreciated by those skilled in the art, that the present invention is not limited to a fixed number of inks and that, more or less inks, inks having same or different colorants, and inks having different colorant concentrations may be used in the ink set.

The present invention can be employed in any reactive system where the first ink is designed to be reactive with the second, and optionally, the fourth inks regardless of the purpose for the reaction. The reaction can serve to enhance any one of a number of print system attributes such as bleed alleviation, smearfastness, improved dry time, or any other desirable attribute.

For illustrative purposes only, unless stated otherwise, black, magenta, cyan, and yellow, will be used to refer to the first through fourth inks; and "bleed" will be used to describe the effects of the reaction between the inks.

It is not uncommon for inks to puddle on the nozzle plate of the ink-jet printhead. This puddling, in turn, may lead to the mixing of the inks, for example during the wiping process. This mixing of the inks, especially when reactive inks are used in association with an integral printhead, may result in reliability problems in the firing chambers. Therefore, when using the reactive ink approaches such as those described above (or any other reactive approach for that matter), it is preferable to separate the ejector portions associated with the sensitive ink, e.g., black; and the target inks, e.g., color inks; from one another. Using this approach, the color inks may all use the same integral printhead or separate integral printheads. But either way, the black ink is associated with a separate integral printhead to prevent the mixing of the inks on the same nozzle plate. This approach although of great merit does not provide the desired flexibility in the design of the ink-jet printing systems. Furthermore, the necessity of designing all color inks to be reactive with the black ink may limit the design space for formulating the color inks. The ink set of the present invention allows for flexibility in the design of the inks and the ink-jet printing systems in which they are used by using a reactive ink set wherein a subset is non-reactive.

The reaction between the mutually reactive inks (e.g., first ink and the second and fourth inks) may employ any one of mechanisms well-known in the art such as, the use of a pH-sensitive colorant, or the use of a precipitating agent, as described in the aforementioned patents and applications.

Ink sets employing the present invention will reduce bleed between adjacently printed areas where one area is printed with one of the mutually reactive inks (e.g., the first ink) and the other area is printed with the other mutually reactive ink (e.g., at least one of the second or fourth inks). Since the third ink is non-reactive with the first ink there is no bleed control between adjacently printed areas where one area is printed with the first ink and the other area is only printed with the third ink. Therefore, it is preferred that the third ink has a color, preferably cyan, that will exhibit the least objectionable bleed when printed next to the first ink, preferably black.

When using a non-reactive ink (an ink non-reactive with, for example, the black ink), e.g., non-reactive cyan, and reactive magenta and yellow inks (reactive with, for example, the black ink), black-to-color bleed would be alleviated for yellow (reactive), magenta (reactive), red (magenta+yellow), blue (cyan+magenta), and green (yellow+cyan), area-fills adjoining areas printed with the black ink because at least one of the reactive inks (for example, yellow or magenta) would be present in the colored area. However, there would be no bleed control when printing the non-reactive ink, e.g., cyan, next to black. Therefore, it may be desirable to reduce or eliminate the bleed between all colors including the first and third inks.

To achieve bleed alleviation between the first and third inks, a printing method is employed (herein referred to as the under-printing method), wherein an area (herein referred to as the first area) to be printed with the first ink (e.g., black) is also, at least partially, printed with at least one ink reactive (e.g., magenta or yellow) with the first ink. The under-printing method provides the necessary immobilization of the colorant of the first ink by virtue of the reaction of an ingredient in the first ink with an ingredient in or property of the reactive ink such that the colorant of the first ink is prevented from migrating into an adjacent area printed with the non-reactive ink. Furthermore, the under-printing method may be utilized to enhance other print system attributes such as smearfastness of the first ink.

The colorants used in the inks may be dye-based or pigment-based. As used herein, the term "pigment" refers to a colorant that is insoluble in the aqueous vehicle, and includes disperse dyes.

Colorants

The colorants employed in the inks may be either dye or pigment-based. The choice of colorants is dependent upon the particular printing application. As in the case of the colorant for the first ink, the choice of colorant further depends on the reaction mechanism of choice, for example—use of pH sensitive colorant, or the use of a precipitating agent (e.g., multi-valent metal salt), or any other suitable reaction mechanism.

Examples of suitable colorants used in the first ink include organic dyes having at least one and preferably two or more carboxyl and/or carboxylate groups examples of which are listed in U.S. Pat. No. 4,963,189 (filed by Hindagolla and assigned to the same assignee as the present invention, and incorporated herein by reference), and carboxylated pigment dispersions having a water insoluble colorant (e.g., pigment) dispersed with a dispersant preferably containing carboxylate solubilizing groups, such as those disclosed in U.S. Pat. No. 5,085,698, and U.S. Pat. No. 5,555,008, both incorporated herein by reference.

Colorants for use in the other inks, i.e., second, third, and fourth inks, are well-known in the art, and for example, as described in the aforementioned patents and applications.

Aqueous Vehicle

The aqueous vehicle is water or a mixture of water and at least one water-soluble organic solvent, as is well-known in the art. Selection of a suitable mixture depends on requirements of the specific application, such as desired surface tension and viscosity, the selected colorant, drying time of the ink-jet ink, and the type of paper onto which the ink will be printed. The inks may further comprise additional ingredients such as biocides, surfactants, and the like, each of which are commonly employed additives in ink-jet printing.

Depending on the reaction mechanism, the reactive inks may have additional ingredients. For example, when the reaction mechanism for reducing bleed is by precipitation of a pH-sensitive colorant in the first ink, the reactive second and fourth inks comprise an organic acid in sufficient amount to render the pH-sensitive colorant of the first ink insoluble upon contact, as disclosed in U.S. Pat. No. 5,679,143 and U.S. application Ser. No. 08/567974, mentioned above.

Alternatively, when the reaction mechanism is based on the use of a precipitating agent, such as multi-valent metal salts, as disclosed in the aforementioned patents, the second and fourth inks contain a precipitating agent, e.g., multi-valent metal salt.

Printing Method

As stated above, when the ink set includes an ink non-reactive with the first ink, a printing method (the under-printing method) may be employed to reduce bleed between the first ink and the non-reactive ink or to enhance other print system attributes. In applying the method, an area (herein referred to as the first area) to be printed with the first ink (e.g., black) is also, at least partially, printed with at least one ink reactive (e.g., magenta or yellow) with the first ink, thereby minimizing the mixing of colors between the first area and a second area to be printed with the non-reactive ink.

The printing method used to alleviate bleed between the first ink and the non-reactive ink using the ink set of the present invention comprises printing from an ink-jet printhead, the method comprising the steps:

providing an ink-jet ink set comprising inks, the inks comprising an aqueous vehicle and a colorant, the ink set comprising:
at least two mutually reactive inks, the at least two mutually reactive inks comprising a first and a second mutually reactive inks;
an ink non-reactive with the at least two mutually reactive inks;
selecting a first predetermined are a on a print medium;
printing at least one drop of one of the mutually reactive inks on the first predetermined print area;
printing at least one drop of the other mutually reactive ink on the first print area such that the at least one drop of the other mutually reactive ink at least partially overlaps with the at least one drop of the one mutually reactive ink, thereby immobilizing the at least one drop of the first mutually reactive ink on the print medium;
selecting a second predetermined print area on the print medium adjacent the first print area; and
printing at least one drop of the non-reactive ink on the second predetermined print area;
thereby minimizing the mixing of the at least one drop of the first mutually reactive ink with the at least one drop of the non-reactive ink on the print medium, thereby reducing bleed between the at least one drop of the first mutually reactive ink and the at least one drop of the non-reactive ink.

It should be appreciated by those skilled in the art, that the immobilization of the colorant of the first ink may take place regardless of the order in which droplets of the first ink and the ink reactive with the first ink are deposited on the print medium. For example, black may be deposited first followed by the magenta or the magenta may be deposited first followed by the black. Similarly, the non-reactive ink may be deposited in any order in relation with the order of drop deposit for the mutually reactive inks, as long as the colorant of the first ink is immobilized by the second ink. For example, cyan may be deposited in the second area, followed by magenta and thereafter black in the first area; or the magenta and black may be deposited in the first area first followed by cyan being deposited in the second area.

EXAMPLES

To demonstrate the effectiveness of the present invention, two ink sets were prepared. Each ink set comprised a first, second, third, and fourth ink, wherein the first ink was reactive with the second and fourth inks. In one embodiment the first, second, third, and fourth inks referred to black, magenta, cyan, and yellow inks, respectively. It is appreciated, however, that the invention is not limited to the choice of colors for each of the first through fourth inks. The first ink set was the control set, wherein the black ink was reactive with the cyan ink using the pH-sensitive colorant bleed mechanism, described above. In the control set, the black ink contained a carbon black pigment dispersed with a carboxylated dispersant (pH-sensitive colorant) and the magenta, yellow, and cyan inks (target inks) contained organic acids and had a pH sufficiently low to cause precipitation of the colorant in the black ink. The second ink set contained the same black, magenta, and yellow inks but the cyan ink did not contain the organic acid and had a pH higher than necessary for the precipitation of the colorant in the black ink, thus non-reactive with the black ink.

It is, however, appreciated by one skilled in the art that the invention is not limited to pigmented inks, nor is it limited to the use of pH-sensitive mechanism as the basis of reaction between the first and third and fourth inks.

Color-to-color bleed was evaluated by printing blocks of differing colors adjacent one another on plain paper, using a Hewlett-Packard DeskJet 870C printer and the corresponding single and tri-chamber print cartridges.

Two groups of plots were generated for each of the two sets of inks. In each group of plots, blocks of black were printed adjacent blocks of cyan, and thereafter the printed samples were visually inspected for the unwanted migration of color from one block to another, particularly, migration of black into cyan. In the first group of plots, the area on the printing medium which was to receive the black ink, was first under-printed with one of the second or fourth inks. In the second group, the black ink was laid down on the printing medium without any under-printing.

Figure 1C:
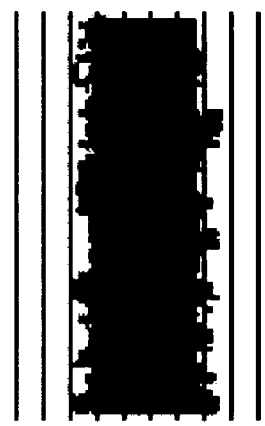
FIG. 1(c) is a line drawing illustrating the bleed occurring between black and cyan (represented by thin vertical lines) inks wherein the black and cyan inks are non-reactive with one another.
Figure 1B:
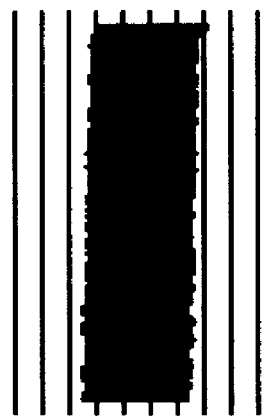
FIG. 1(b) is a line drawing illustrating the bleed occurring between black and cyan (represented by thin vertical lines) inks wherein the black and cyan inks are reactive with one another and wherein the area printed with the black ink is first under-printed with another ink reactive with the black ink.
Figure 1D:
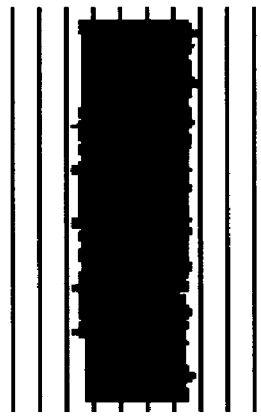
FIG. 1(d) is a line drawing illustrating the bleed occurring between black and cyan (represented by thin vertical lines) inks wherein the black and cyan inks are non-reactive with one another and wherein the area printed with the black ink is first under-printed with another ink that is reactive with the black ink.

FIGS. 1(a) through 1(d) are line drawings illustrating the bleed occurring between black and cyan (represented by thin vertical lines) inks for each of the ink sets and each group of plots. Table I summarizes the results of the visual inspection of the plots for bleed performance.

TABLE I

| FIG. | Ink Set Id | Print Group ID | Bleed alleviation |
| --- | --- | --- | --- |
| 1 (a) | Control (reactive cyan) | No under-printing | excellent |
| 1 (b) | Control (reactive cyan) | Under-printing | Same as Control |

TABLE I-continued

| FIG. | Ink Set Id | Print Group ID | Bleed alleviation |
|---|---|---|---|
| 1 (c) | Non-reactive cyan | No under-printing | Poor |
| 1 (d) | Non-reactive cyan | Under-printing | Same as Control |

As can be seen from FIGS. 1(a) through 1(d) and the results in Table I, samples generated using non-reactive cyan and the under-printing method exhibited excellent bleed alleviation.

The reliability of the ink sets was evaluated by measuring the effect of reactive versus non-reactive cyan on generating solid area fills. Two groups of integral tri-chamber (or tri-reservoir) print cartridges were filled with ink. In the first group, using the inks from the control ink set, reactive cyan was placed in the middle ink chamber with the outer two ink chambers filled with black ink. In the second group, using the inks from Ink Set 2, the middle ink chamber contained non-reactive cyan and the outer two ink chambers were filled with black ink. Print samples having black area fills were generated with each group of print cartridges. The optical density for the area fills were measured using a commercial densitometer and standard measurement procedures. The printheads were then primed during which cyan ink from the cyan ink chamber was mixed with black ink from the black ink chambers on the printhead's top plate. The same print cartridges were then used again to generate new print samples. The optical density for the "after-prime" area fills were measured. The optical density of the "before-prime" and "after-prime" samples are reported in Table II, below:

TABLE II

| | OPTICAL DENSITY FOR BLACK AREA FILLS (OD) (±0.02) | |
|---|---|---|
| PRINT SAMPLE | Non-reactive cyan (Control Ink set) | Reactive cyan (Second Ink set) |
| Before priming | 1.4 | 1.4 |
| After priming | 1.4 | 0.9 |

As can be seen from the data in Table II, print cartridges having reactive cyan in the middle chamber exhibited lower optical densities after priming. The lower optical densities were due to the reactive cyan ink's reaction with the black ink and causing, at least partially, clogged nozzles associated with the black ink. The optical density obtained with print cartridges having non-reactive cyan were not affected by the priming of the print cartridges. It is desirable to have constant optical density during the life of the ink-jet print cartridges.

INDUSTRIAL APPLICABILITY

The present ink set, and the printing method for reducing bleed, are expected to find commercial use in ink-jet printing.

Thus, there has been disclosed an ink set and a method for ink-jet printing using the same utilizing the advantages of reactive inks while allowing flexibility in the design of the inks and the architecture of the ink-jet printing systems in which they are used. It will be readily apparent to those skilled in the art that various changes and modifications of an obvious nature may be made without departing from the spirit of the invention, and all such changes and modifications are considered to fall within the scope of the invention as defined by the appended claims.

What is claimed is:

1. An ink set comprising inks, the inks comprising an aqueous vehicle and a colorant, the ink set comprising:
    at least two mutually reactive inks, the at least two mutually reactive inks comprising a first and a second mutually reactive inks; and
    an ink non-reactive with the at least two mutually reactive inks.

2. The ink set of claim 1 wherein the first mutually reactive ink is black, the second mutually reactive ink is magenta or yellow, and the non-reactive ink is cyan.

3. The ink set of claim 1 wherein the first mutually reactive ink has a pH sensitive ingredient, and the second mutually reactive ink has a pH such that in the event that the first mutually reactive ink and the second mutually reactive ink come in contact on a print medium, the first mutually reactive ink is precipitated upon contact with the second mutually reactive ink.

4. The ink set of claim 3 wherein the pH sensitive ingredient of the first mutually reactive ink is the colorant.

5. The ink set of claim 1 where in the first mutually reactive ink has an ingredient having a first ionic charge, and the second mutually reactive ink has an ingredient having a second ionic charge opposite that of the first ionic charge such that in the event that the first mutually reactive ink and the second mutually reactive ink come in contact on a print medium, the first mutually reactive ink is precipitated upon contact with the second mutually reactive ink.

6. The ink set of claim 5 wherein the ingredient of the first mutually reactive ink having a first ionic charge is the colorant.

7. The ink set of claim 1 further comprising a third mutually reactive ink reactive with the first ink.

8. The ink set of claim 7 wherein the second mutually reactive ink is magenta and the third mutually reactive ink is yellow.

9. The ink set of claim 7 wherein the first mutually reactive ink has a pH sensitive ingredient, and either or both the second and the third mutually reactive inks have a pH such that in the event that the first ink, and either or both the second and third mutually reactive inks, come in contact on a print medium, the first mutually reactive ink is precipitated upon contact with either or both the second and the third mutually reactive inks.

10. The ink set of claim 9 wherein the pH sensitive ingredient of the first mutually reactive ink is the colorant.

11. The ink set of claim 7 wherein the first mutually reactive ink has an ingredient having an ionic charge, and either or both the second and the third mutually reactive inks have an ingredient having an ionic charge opposite that of the ionic charge of the first mutually reactive ink, such that in the event that the first mutually reactive ink and either or both the second and the third mutually reactive inks come in contact on a print medium, the first mutually reactive ink is precipitated upon contact with either or both the second and the third mutually reactive inks.

12. The ink set of claim 11 wherein the ingredient of the first mutually reactive ink having an ionic charge is the colorant.

13. A method for reducing bleed in printing on a print medium from an ink-jet printhead, the method comprising the steps of:
    providing an ink-jet ink set comprising inks, the inks comprising an aqueous vehicle and a colorant, the ink set comprising:

at least two mutually reactive inks, the at least two mutually reactive inks comprising a first and a second mutually reactive inks;

an ink non-reactive with the at least two mutually reactive inks;

selecting a first area on a print medium;

printing at least one drop of one of the mutually reactive inks on the first print area;

printing at least one drop of the other mutually reactive ink on the first print area such that the at least one drop of the other mutually reactive ink at least partially overlaps with the at least one drop of the one mutually reactive ink, thereby immobilizing the at least one drop of the first mutually reactive ink on the print medium;

selecting a second print area on the print medium adjacent the first print area; and printing at least one drop of the non-reactive ink on the second print area;

thereby minimizing the mixing of the at least one drop of the first mutually reactive ink with the at least one drop of the non-reactive ink on the print medium, thereby reducing bleed between the at least one drop of the first mutually reactive ink and the at least one drop of the non-reactive ink.

14. The method of claim 13 wherein the first mutually reactive ink is black, the second mutually reactive ink is magenta or yellow, and the non-reactive ink is cyan.

15. The method of claim 13 wherein the first mutually reactive ink has a pH sensitive ingredient, and the second mutually reactive ink has a pH such that in the event that the first mutually reactive ink and the second mutually reactive ink come in contact on a print medium, the first mutually reactive ink is precipitated upon contact with the second mutually reactive ink.

16. The method of claim 15 wherein the pH sensitive ingredient of the first mutually reactive ink is the colorant.

17. The method of claim 13 wherein the first mutually reactive ink has an ingredient having a first ionic charge, and the second mutually reactive ink has an ingredient having a second ionic charge opposite that of the first ionic charge such that in the event that the first mutually reactive ink and the second mutually reactive ink come in contact on a print medium, the first mutually ink is precipitated upon contact with the second mutually ink.

18. The method of claim 17 wherein the ingredient of the first mutually reactive ink having a first ionic charge is the colorant.

19. The method of claim 13 further comprising a third mutually reactive ink reactive with the first ink.

20. The method of claim 19 wherein the second mutually reactive ink is magenta and the third mutually reactive ink is yellow.

21. The method of claim 19 wherein the first mutually reactive ink has a pH sensitive ingredient, and either or both the second and the third mutually reactive inks have a pH such that in the event that the first ink, and either or both the second and the third mutually reactive inks, come in contact on a print medium, the first mutually reactive ink is precipitated upon contact with either or both the second and the third mutually reactive inks.

22. The method of claim 21 wherein the pH sensitive ingredient of the first mutually reactive ink is the colorant.

23. The method of claim 19 wherein the first mutually reactive ink has an ingredient having an ionic charge, and either or both the second and the third mutually reactive inks have an ingredient having an ionic charge opposite that of the ionic charge of the first mutually reactive ink, such that in the event that the first mutually reactive ink and either or both the second and the third mutually reactive inks come in contact on a print medium, the first mutually reactive ink is precipitated upon contact with either or both the second and the third mutually reactive inks.

24. The method of claim 23 wherein the ingredient of the first mutually reactive ink having an ionic charge is the colorant.

25. A method for enhancing a print system attribute in printing on a print medium from an ink-jet printhead, the method comprising the steps of:

providing an ink-jet method comprising inks, the inks comprising an aqueous vehicle and a colorant, the method comprising at least two mutually reactive inks, the at least two mutually reactive inks comprising a first and a second mutually reactive inks;

an ink non-reactive with the at least two mutually reactive inks;

selecting a first area on a print medium;

printing at least one drop of one of the mutually reactive inks on the first print area;

printing at least one drop of the other mutually reactive ink on the first print area such that the at least one drop of the other mutually reactive ink at least partially overlaps with the at least one drop of the one mutually reactive ink;

wherein the at least one drop of the one mutually reactive ink and the at least one drop of the other mutually reactive ink react, thereby enhancing a print system attribute as a result of the reaction.

26. The method of claim 25 wherein the at least one drop of the one mutually reactive ink and the at least one drop of the other mutually reactive ink react, thereby immobilizing the at least one drop of the first mutually reactive ink on the print medium.

27. The method of claim 25 wherein the first mutually reactive ink has an ingredient having a first ionic charge, and the second mutually reactive ink has an ingredient having a second ionic charge opposite that of the first ionic charge such that in the event that the first mutually reactive ink and the second mutually reactive ink come in contact on a print medium, the first mutually ink is precipitated upon contact with the second mutually ink.

* * * * *